United States Patent [19]

Scheit et al.

[11] Patent Number: 4,884,771
[45] Date of Patent: Dec. 5, 1989

[54] METHOD FOR CALIBRATING THE GYROS OF A 3-AXIS STABILIZED SATELLITE

[75] Inventors: Arnold Scheit, Munich; Ernst Brüderle, Ottobrunn, both of Fed. Rep. of Germany

[73] Assignee: Messerschmitt-Bolkow-Blohm GmbH, Ottobrunn, Fed. Rep. of Germany

[21] Appl. No.: 258,024

[22] Filed: Oct. 14, 1988

[30] Foreign Application Priority Data

Oct. 15, 1987 [DE] Fed. Rep. of Germany ....... 3734941

[51] Int. Cl.$^4$ .............................................. B64G 1/28
[52] U.S. Cl. .................................... 244/165; 244/171; 73/1 E
[58] Field of Search ...................... 244/164, 165, 171; 73/1 E; 74/5 R

[56] References Cited

U.S. PATENT DOCUMENTS 3,731,521  5/1973  Solov et al. ........................... 73/1 E
3,782,167  1/1974  Stuelpnagel ........................... 73/1 E

*Primary Examiner*—Galen L. Barefoot
*Assistant Examiner*—Rodney Corl
*Attorney, Agent, or Firm*—Toren, McGeady & Associates

[57] ABSTRACT

This method serves for calibrating gyros forming part of the attitude control system of a satellite stabilized in three axes and which have an unknown drift. A two-axis sensor measuring the direction of a radiating reference object in the coordinate system x, y, z fixed with respect to the satellite is used. Two reference attitudes each different with respect to the reference object are commanded to the satellite in the course of two consecutive time intervals spaced from each other. The values measured by the sensor representing the respective actual direction of the reference object are recorded at the start and at the end of the time intervals. The respective time integrals of the gyro output signals are computed during the time intervals, which represent the gyro drift plus the respective instantaneous satellite deviation from the commanded reference attitude. Finally the gyro drift is determined from these time integrals and the values measured by the sensor.

4 Claims, 2 Drawing Sheets

METHOD FOR CALIBRATING THE GYROS OF A 3-AXIS STABILIZED SATELLITE

The invention is directed to a method for calibrating gyros belonging to the attitude control system of a 3-axis stabilized satellite and which at times have an initially unknown drift, by the use of a two-axis sensor measuring the direction of a radiating reference object in a coordinate system integral with or fixed with respect to the satellite.

BACKGROUND OF THE INVENTION

Three-axis stabilized satellites, especially geosynchronous satellites, comprise often a three-axis gyro package with the help of which attitude changes of the satellite, meaning rotations around one or several of the three axes of the coordinate system fixed with respect to the satellite, can be monitored by measurements. The premise for a trouble-free measurement is herein the principle that the gyros, whose axes of rotation are arranged parallel to the respective axes of the coordinate system fixed with respect to the satellite, reflect their rotations explicitly by their output signals. It has however been seen that the gyros tend to drift, meaning they supply an output signal even when no rotations have occurred. The extent of these drifts is to begin with not known. It is however imperative, before certain attitude change maneuvers can be carried out, that the initial attitude or orientation of the satellite can be precisely determined.

Thus there results the necessity, for instance during the transfer phase of a geosynchronous earth satellite prior to firing the apogee thruster, of bringing the satellite into an initial attitude favorable for this maneuver, to orient it for instance with its roll axis in the direction of the thruster impulse. A reference in three axes is required for attitude determination, which generally is given by the sun and the earth. The attitude determination and the reorientation of the satellite into the desired initial attitude for an apogee insertion requires a certain time period, and it can occur that, at the point in time of the attitude determination, a point on the path has been reached where sun, satellite and earth lie in one straight line and the three-axis reference is thus no longer available. The missing reference can be replaced by an integrating gyro, which on its part assumes its reference at an earlier geometrically more favorable instant, when a sufficiently accurately defined attitude of the satellite can be adjusted with the help of solar sensors and an earth sensor. Since however the gyro has an unknown drift to begin with, the attitude determination performed by said gyro directly prior to the reorientation of the satellite for the purpose of the apogee insertion can already comprise again such a high inaccuracy, that finally unacceptable directional errors arise during the apogee insertion. The gyro drift must be determined in order to avoid this, meaning the gyros must be calibrated or gauged. Then the gyro drift can be taken into account during the attitude determination.

SUMMARY OF THE INVENTION

The invention is based upon the idea of making available a method of the previously described type which enables performance of the gyro calibration reliably and with the least amount of apparatus.

This is solved in accordance with the invention by a method using a two-axis sensor measuring direction of the radiating reference while commanding the satellite to adopt two different reference attitudes during two consecutive time intervals, recording the actual directions of the reference during the two time intervals, obtaining the time integrals of the gyro output signals during the two time intervals, and determining the gyro drift from the time integrals representing the gyro drift plus the instantaneous respective satellite deviation from the commanded reference orientations and from the sensor measurements.

Thus, the method of the invention requires essentially only one two-axis sensor apart from the already in any case existing integrators for the gyro output signals, with which sensor a radiating reference object, which generally can be constituted by the sun but also by a star, is observed. The calibration process is subdivided into two consecutive calibration phases slightly spaced apart timewise. During a first phase or a first time interval a first reference attitude is commanded to the satellite by means of its attitude control system. This is defined by a first constant specified direction of the reference object in a coordinate system fixed with respect to the satellite. The satellite is maintained in the reference attitude during this first time interval. The measured values of the sensor are recorded respectively at the start and at the end of the time interval, which represent the actual instantaneous direction of the reference object. Actually small deviations from this reference orientation will occur during the corresponding control process, although a fixed reference attitude is commanded to the satellite. Furthermore, the gyro output signals are integrated with respect to time during the duration of the entire time interval. These time integrals as well as the measured values recorded at the start and end of the time interval are processed in the computer later on. The second calibration phase performed during a second time interval occurs analogously to the first one, only with the difference that the satellite is commanded to assume a reference attitude different from the first one. This new attitude is again defined by another again constant specified direction of the reference object in the coordinate system fixed with respect to the satellite. These specified directions are given by appropriate unit vectors $\vec{S}_{Rij}$, wherein i, j assume the values 1 and 2 during the first calibration phase and the values 3 and 4 during the second calibration phase.

The time integrals of the gyro output signals formed during the two calibration phases or time intervals represent the gyro drift plus the respective momentary satellite deviation from the commanded reference attitude. The gyro drift can then be determined by computation from these time integrals and the values measured by the sensor, which contain the deviations from the commanded reference attitudes.

Thus, the invention is based upon the concept that it must be feasible to isolate the gyro drift by measurement technology, if the satellite is kept fixed in a reference attitude. In that case, no output signals would occur with ideal gyros. The gyro drift existing independently of the attitude changes of the satellite must then however be prone to measurement in an isolated fashion. It is to be sure not possible in actual practice, to actually maintain the satellite so as to be fixed in a predetermined reference attitude. Rather, it will always try to migrate out of this attitude because of small interferences, and the attitude control system will then return it for a short time to the desired reference attitude. These momentary deviations from the reference attitude are however measured by the gyros and are included in their output signals. Therefore it is necessary to determine the deviations separately in the course of an independent measuring process. In actual practice this is accomplished by the two-axis sensor, which observes the radiating reference object during the calibration phase.

The mathematical treatment of this basic idea leads to the finding that two calibration phases are to be performed in the course of two consecutive time intervals as has already been described above. One single time interval would not be sufficient, since at that time insufficient measuring information is available. It is namely seen that the method mathematically involves the determination of three unknowns, namely the three components $\omega_{Dx}$, $\omega_{Dy}$ as well as $\omega_{Dz}$ of the vector $\vec{\omega}_D$ of the gyro drift. Herein the three components $\omega_{Dx}$, $\omega_{Dy}$ and $\omega_{Dz}$ correspond to the three rotations $\Phi$, $\theta$ as well as $\psi$ around the three axes x, y as well as z in the coordinate system fixed with respect to the satellite. At least three equations are required for determining the three unknowns, and since only two equations can be derived from one calibration phase, a total of two calibration phases must be performed.

BRIEF DESCRIPTION OF THE DRAWINGS

The invention will now be described in greater detail with the help of the annexed drawings showing the principle of operation as well as a preferred embodiment. In particular:

FIG. 1 shows in perspective presentation a coordinate system x, y, z fixed with respect to the satellite as well as a unit vector $\vec{S}_R$ with its components $S_{bx}$, $S_{by}$ and $S_{bz}$, which points in the direction of a reference object, for instance the sun. Assume that the satellite with its coordinate system x, y, z integral with it is brought in such an attitude, that the unit vector $\vec{S}_R$ indicates the specified direction of the reference object. A two-axis sensor is assumed to view in the direction of the x-axis, so that its two-dimensional field of view covers a portion of the yz-plane, for instance a sector of $\pm 60°$ on both sides of the y-and z-axes. If the satellite is in a reference attitude commanded during the calibrating phases, and if thus the unit vector $\vec{S}_R$ points precisely to the reference object, then the sensor measures the component ratios $S_{bz}/S_{bx}$ as well as $S_{by}/S_{bx}$ or known functions of $S_{bx}, S_{by}, S_{bz}$, from which the component ratios can be determined. Two sensors can also be utilized, of which the one (pitch sensor) measures only the quotient $S_{bz}/S_{bx}$ and the other (yaw sensor) measures the quotient $S_{by}/S_{bx}$.

Figure 1:
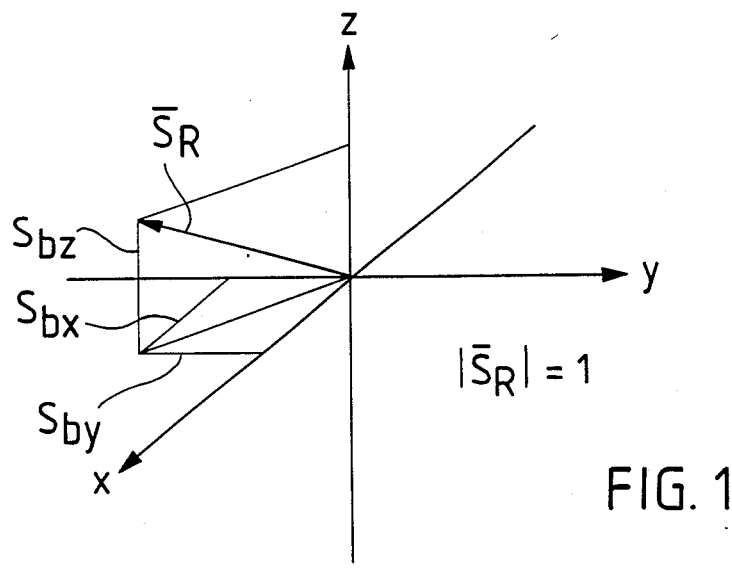
FIG. 1 shows diagrammatically a unit vector in the coordinate system fixed with respect to the satellite corresponding to a specified direction of the reference object.

As has already been discussed above, it will not be possible to maintain the satellite rigorously fixed in the commanded reference attitude; rather small deviations from this attitude will occur. The values measured by the sensor will thus reflect the component ratios of another unit vector $\vec{S}_B$ aiming at the reference object, which is slightly rotated with respect to the unit vector $\vec{S}_R$. This corresponds to a rotation of the satellite around its three axes x, y, z through the small angles $\Phi$, $\theta$ and $\psi$. The following known relationship exists between the unit vectors and $\vec{S}_B$ and $\vec{S}_R$, which belong to the actually existing direction of the reference object or its specified direction, if the squares of small angles are neglected:

$$\vec{S}_B = \begin{pmatrix} 1 & \psi & -\theta \\ -\psi & 1 & \phi \\ \theta & -\phi & 1 \end{pmatrix} \vec{S}_R \tag{1}$$

From this one obtains the following relationship again neglecting the squares of the small angles:

$$\vec{N}_S = M(\vec{S}_R)\vec{a} + \vec{N}_R \tag{2}$$

Herein $\vec{N}_S$ designates a two-dimensional vector, whose components $N_{sy}=S_{By}/S_{Bx}$ as well as $N_{sz}=S_{Bz}/S_{Bx}$ represent the two measured values of the sensor, $\vec{a}$ represents the vector of the total angle consisting of the components $\Phi, \theta$ and $\psi$ through which the actual direction of the reference object with respect to the specified direction of the satellite with respect to its commanded reference attitude is rotated, $\vec{N}_R$ represents a two-dimensional vector, whose components $N_{Ry}=S_{by}/S_{bx}$ and $N_{Rz}=S_{bz}/S_{bx}$ represent those values measured by the sensor, which would result in case of coincidence of the actual attitude of the satellite with the commanded reference attitude, where $M(\vec{S}_R)$ represents the following matrix:

$$M(\vec{S}_R) = \begin{pmatrix} \dfrac{S_{by}}{S_{bx}} & 1 + \left(\dfrac{S_{bz}}{S_{bx}}\right)^2 & \dfrac{S_{by} S_{bz}}{S_{bx}^2} \\ -\dfrac{S_{bz}}{S_{bx}} & \dfrac{S_{by} S_{bz}}{S_{bx}^2} & 1 + \left(\dfrac{S_{by}}{S_{bx}}\right)^2 \end{pmatrix} \tag{3}$$

The measured signal $\omega_{Mx}$ of a gyro is composed of the addition of the shares $\omega_x$ and $\omega_{Dx}$, which correspond to the actual satellite rotation (angular velocity) as well as the gyro drift around the respective axis. In case of a small rotation of the satellite around all of its three axes with the respective angular velocities $\Phi$, $\theta$, $\psi$, the three respective gyros yield three measured signals, which can be combined to form vector $\vec{\omega}_M$:

$$\vec{\omega}_M = \vec{\omega} + \vec{\omega}_D \tag{4}$$

Herein $\vec{\omega}_M$, $\vec{\omega}$ and $\vec{\omega}_D$ are respectively three-dimensional vectors with the components $$\vec{\omega}_M = \begin{pmatrix} \omega_{Mx} \\ \omega_{My} \\ \omega_{Mz} \end{pmatrix}, \vec{\omega} = \begin{pmatrix} \phi \\ \theta \\ \psi \end{pmatrix}, \vec{\omega}_D = \begin{pmatrix} \omega_{Dx} \\ \omega_{Dy} \\ \omega_{Dz} \end{pmatrix} \tag{5}$$

The three components of the vector $\vec{\omega}_D$ the unknowns representing the entire gyro drift.

By integration of the equation (4) between the points in the time $t_i$ and $t_j$ and observing the relationship $\omega = \alpha$ one obtains:

$$\int_{t_i}^{t_j} \omega_D dt = \alpha_j - \alpha_i + \omega_D(t_j - t_i) \quad (6)$$

Herein it is assumed that the gyro drift $\vec{\omega}_D$ is constant during the time interval $\Delta t_{ij}$ ($t_i \leq t \leq t_j$). After multiplying the entire equation (6) with the matrix $M_{ij}(\vec{S}_R)$ as well as observing equation (2) and the requirement $\vec{N}_{Rj} = \vec{N}_{Ri}$ (see further below) one obtains:

$$M_{ij}(\vec{S}_R) \int_{t_i}^{t_j} \omega_M dt = \vec{N}_{Sj} - \vec{N}_{Si} + M_{ij}(\vec{S}_R) \vec{\omega}_D(t_j - t_i) \quad (7)$$

From this one obtains by a rearrangement of the terms:

$$M_{ij}(\vec{S}_R)\vec{\omega}_D = \frac{M_{ij}(\vec{S}_R)}{t_j - t_i} \int_{t_i}^{t_j} \omega_M dt - \frac{1}{t_j - t_i}(\vec{N}_{Sj} - \vec{N}_{Si}) \quad (8)$$

This is a collective presentation of two equations for the three unknowns $\omega_{Dx}$, $\omega_{Dy}$, $\omega_{Dz}$. At least another equation is required for determination of these three unknowns. Two additional equations can be derived from the system of equations (8), by utilizing an additional time interval $\Delta t_{ij}$. Thus we now have four equations for the three unknowns for the two time intervals $\Delta t_{12}$ and $\Delta t_{34}$. These equations state that the gyro output signals $\vec{\omega}_M$ are to be integrated between the points in time $t_i$ and $t_j$, and that furthermore the measured values $N_{Si}$ as well as $N_{Sj}$ of the sensor at these points in time must be taken into account. The requirement established above, that namely $\vec{N}_{Ri}$ is to be $=\vec{N}_{Rj}$ corresponds to the condition that a constant reference attitude is being commanded to the satellite during the time interval $\Delta t_{ij}$, and that the unit vector $\vec{S}_R$ for the specified direction of the reference object is thus constant during this time interval.

Figure 2:
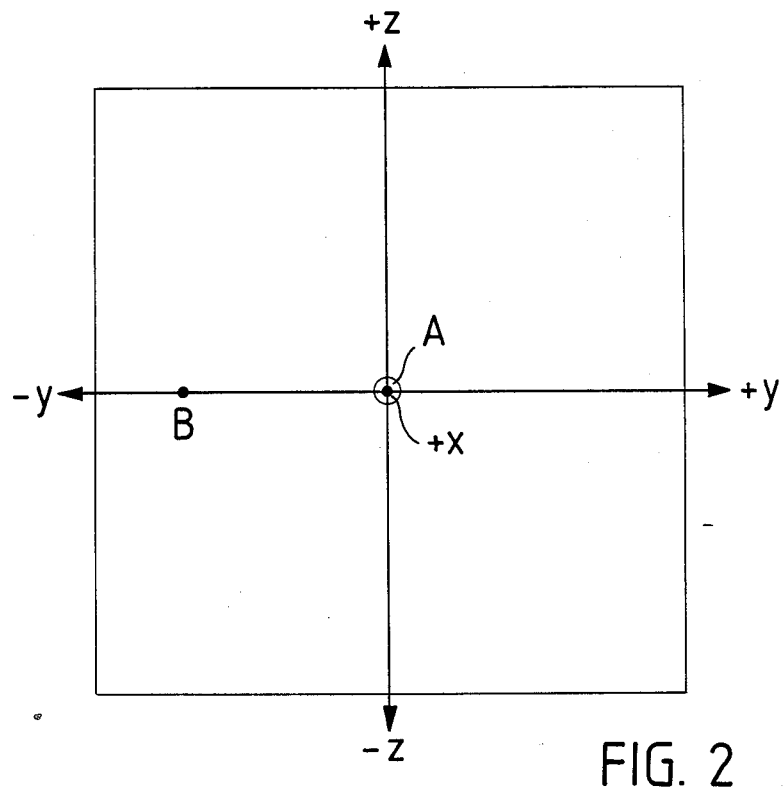
FIG. 2 shows diagrammatically a possible pair of specified positions of the reference object in the field of view of the sensor.

A field of view of a two-axis sensor for the reference object is depicted in FIG. 2 wherein it is assumed that this sensor views in the direction of the positive x-axis of the satellite. Two points A and B are entered, which are intended to indicate two reference attitudes of the satellite during the two time intervals. These two reference attitudes are chosen in such a way that the evaluation of the systems of equations (8) becomes particularly simple. The first reference attitude A is given by the circumstance that the unit vector $\vec{S}_R$ for the first specified direction of the reference object is to point precisely in the direction of positive x-axis. Thus the components $S_{by} = S_{bz} = 0$. The second reference attitude of the satellite commanded during a second time interval is given by the condition that the unit vector $\vec{S}_R$ for the second specified direction of the reference object points in the direction of the line bisecting the angle between the positive x- as well as the negative y-axis. The reference object then appears in the two-dimensional field of view of the sensor being displaced on the y-axis towards the negative values from the zero point. This second reference attitude of the satellite can be attained by rotating the satellite through 45°. in a positive direction of rotation around the z-axis. The relationship $S_{by}/S_{bx} = 1$ then exists between the x- and y-components of the unit vector $\vec{S}_R$ during the second reference attitude (or the second time interval or the second calibrating phase).

Figure 3:
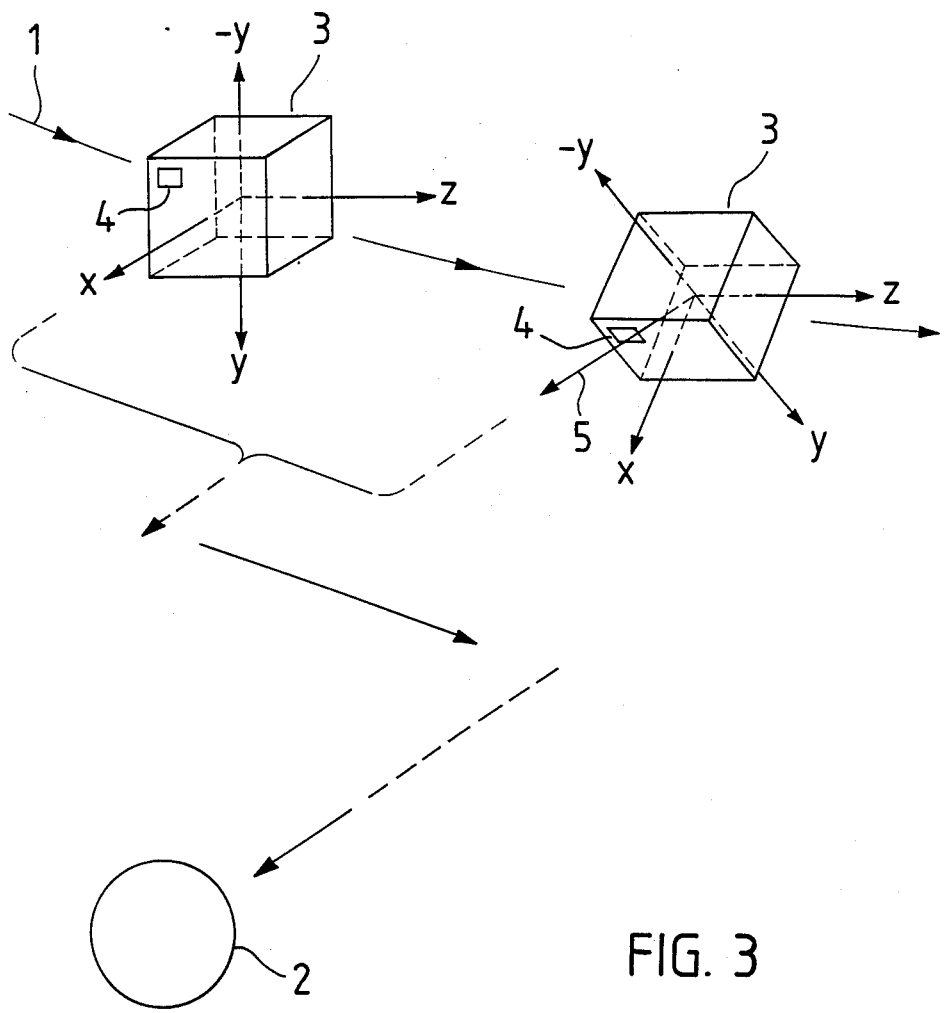
FIG. 3 shows diagrammatically the orientation of a satellite with respect to the reference object during two calibration phases in carrying out.

Two special reference attitudes of satellite 3, which have been described, are depicted diagrammatically in FIG. 3. This satellite is in its orbit 1 in the orbiting direction indicated by the arrows. A reference object 2 is located in the far distance, being for instance the sun. In the reference attitude of the satellite 3 depicted on the left hand side, which satellite additionally comprises a two-dimensional sensor 4 sighting in the direction of the x-axis of the coordinate system x, y, z fixed with respect to the satellite, the x-axis is oriented precisely in the direction of the reference object 2, while the z-axis can lie in the orbital plane. The satellite 3 is maintained in this reference attitude by its attitude control system (not depicted here) during an entire first time interval $\Delta t_{12}$ ($t_1 \leq t \leq t_2$). After termination of the first time interval a rotation through an angle of 45° in a positive direction of rotation is commanded around the z-axis (possibly after a short time period). Thereupon the satellite 3 assumes the second reference attitude depicted on the right hand side. The line 5 bisecting the angle between the positive x- and the negative y-axis now points in the direction of the reference object 2. The z-axis has not changed its orientation in space, thus continues to lie within the orbital plane as well as perpendicularly with respect to the line connecting the satellite center with the reference object. The satellite is maintained in this second reference attitude during the entire second time interval $\Delta t_{34}$ ($t_3 \leq t \leq t_4$) by the attitude control system, apart naturally from the unavoidable deviations mentioned already above, which however are determined by sensor measurements.

For the special case of the two satellite reference attitudes specifically named above, there results the following mathematical solution of the system of equation (8). To begin with, one obtains with the stated special conditions $S_{by} = S_{bz} = 0$ for the first calibration phase or the first time interval $\Delta t_{12}$ as well as $S_{by}/S_{bx} = -1$ and $S_{bz} = 0$ for the second calibration phase or the second time interval $\Delta t_{34}$, one obtains from the matrix M in equation (3);

$$M_{12} = \begin{pmatrix} 0 & 1 & 0 \\ 0 & 0 & 1 \end{pmatrix}, M_{34} = \begin{pmatrix} -1 & 1 & 0 \\ 0 & 0 & 2 \end{pmatrix} \quad (9)$$

With these special matrices there results from equation (8) the following relationship for the two time intervals $\Delta t_{12}$ and $\Delta t_{34}$:

$$\begin{pmatrix} 0 & 1 & 0 \\ 0 & 0 & 1 \end{pmatrix} \vec{\omega}_D = \frac{\begin{pmatrix} 0 & 1 & 0 \\ 0 & 0 & 1 \end{pmatrix}}{\Delta t_{12}} \int_{t_1}^{t_2} \vec{\omega}_M dt - \frac{1}{\Delta t_{12}}(\vec{N}_{S2} - \vec{N}_{S1}) \quad (10a)$$

$$\begin{pmatrix} -1 & 1 & 0 \\ 0 & 0 & 2 \end{pmatrix} \vec{\omega}_D = \quad (10b)$$

$$\frac{\begin{pmatrix} -1 & 1 & 0 \\ 0 & 0 & 2 \end{pmatrix}}{\Delta t_{34}} \int_{t_3}^{t_4} \vec{\omega}_M dt - \frac{1}{\Delta t_{34}}(\vec{N}_{S4} - \vec{N}_{S3})$$

From the equation corresponding to the upper matrix line of equation (10a) there results $$\omega_{Dy} = \frac{1}{\Delta t_{12}} \int_{t_1}^{t_2} \omega_{My} dt - \frac{1}{\Delta t_{12}} (N_{Sy2} - N_{Sy1}) \quad (11)$$

and from the equation corresponding to the upper matrix line of equation (10b) there results $$\omega_{Dx} = \omega_{Dy} + \frac{1}{\Delta t_{34}} \int_{t_3}^{t_4} \omega_{Mx} dt - \quad (12)$$

$$\frac{1}{\Delta t_{34}} \int_{t_3}^{t_4} \omega_{My} dt + \frac{1}{\Delta t_{34}} (N_{Sy4} - N_{Sy3})$$

Finally one obtains two definitive equations independent of each other for $\omega_{Dz}$ from the two equations corresponding to the bottom matrix lines of equations (10a) and (10b):

$$\omega_{Dz} = \frac{1}{\Delta t_{12}} \int_{t_1}^{t_2} \omega_{Mz} dt - \frac{1}{\Delta t_{12}} (N_{Sz2} - N_{Sz1}) \quad (13a)$$

$$\omega_{Dz} = \frac{1}{\Delta t_{34}} \int_{t_3}^{t_4} \omega_{Mz} dt - \frac{1}{2\Delta t_{34}} (N_{Sz4} - N_{Sz3}) \quad (13b)$$

The three unknowns $\omega_{Dx}$, $\omega_{Dy}$, and $\omega_{Dz}$ can be determined from the equations (11) to (13b). Herein one has to integrate the gyro output signals $\omega_{Mx}$, $\omega_{My}$, and $\omega_{Mz}$ during the two time intervals $\Delta t_{12}$ and $\Delta t_{34}$, and additionally the sensor output signals $N_{Sy}$ as well as $N_{Sz}$ corresponding to the two axis directions y and z at the points in time $t_1$, $t_2$, $t_3$ and $t_4$ must be taken into account.

It should be pointed out that naturally also other reference attitudes of the satellite than those indicated in FIG. 2 (A,B) can be utilized. The special case specifically discussed above is merely distinguished by the mathematical solution being particularly simple. It could also prove expedient to use other reference objects than the sun, possibly a certain fixed star. The application of this method is also not limited to geosynchronous satellites.

While certain embodiments that are preferred have been described herein, it is understood that the invention is not limited thereby and other variations will be evident to those skilled in this art and are intended to be included within the scope of the appended claims.

We claim:

1. A method for calibrating gyros having an unknown drift and forming part of the attitude control system of a 3-axis stabilized satellite comprising the steps:
   (a) providing a two-axis sensor capable of measuring the direction of a radiating reference object in a coordinate system fixed with respect to the satellite,
   (b) commanding the satellite to adopt two different reference attitudes during two consecutive time intervals,
   (c) obtaining the actual direction of the radiating reference object during the two time intervals,
   (d) determining during the two time intervals the deviation of the actual attitude of the satellite from its commanded attitude,
   (e) obtaining the time integrals of the gyro's output signals during the two time intervals, and
   (f) determining the gyro drift from the time integrals obtained in step (e) and the deviation values obtained in step (d).

2. A method for calibrating gyros having an unknown drift and forming part of the attitude control system of a three-axis stabilized satellite using a two-axis sensor measuring the direction of a radiating reference object in the coordinate system x, y, z, fixed with respect to the satellite, comprising the steps:
   (a) commanding the satellite by its attitude control system during two consecutive time intervals $\Delta t_{ij}$ ($t_i \leq t \leq t_j$; i=1,3 and j=2,4) which are spaced from each other to adopt two reference attitudes defined by in each case differing constant specified directions (unit vector $\vec{S}_{Rij}$) of the reference object in the coordinate system fixed with respect to the satellite,
   (b) measuring with the sensor the values ($\vec{N}_{Si}$, $\vec{N}_{Sj}$) representing the respective actual direction of the reference object and recording same in each case at the start $t_i$ and at the end $t_j$ of the time intervals $\Delta t_{ij}$,
   (c) obtaining the time integrals of the gyro output signals $\vec{\omega}_M$ formed respectively during the two time intervals $\Delta t_{ij}$, and
   (d) determining the gyro drift from the time integrals representing the gyro drift $\vec{\omega}_D$ plus the instantaneous respective satellite deviation from the commanded reference attitude $\vec{S}_{Rij}$ and from the values measured by the sensor.

3. A method according to claim 2, using a sensor sighting in the direction of the x-axis of the satellite, characterized in that the gyro drift $\vec{\omega}_D$ is determined by means of the formula $$M_{ij}\vec{\omega}_D = \frac{M_{ij}}{t_j - t_i} \int_{t_i}^{t_j} \vec{\omega}_M dt - \frac{1}{t_j - t_i} (\vec{N}_{Sj} - \vec{N}_{Si})$$

wherein $M_{ij}$ is the matrix which is constant during the respective time interval $\Delta t_{ij}$ $$M_{ij} = \begin{pmatrix} \frac{S_{by}}{S_{bs}} & 1 + \left(\frac{S_{bz}}{S_{bx}}\right)^2 & \frac{S_{by} S_{bz}}{S_{bx}^2} \\ -\frac{S_{bz}}{S_{bx}} & \frac{S_{by} S_{bz}}{S_{bx}^2} & 1 + \left(\frac{S_{by}}{S_{bx}}\right)^2 \end{pmatrix}$$

and $S_{bx}$, $S_{by}$, $S_{bz}$ are the components of the unit vector $\vec{S}_{Rij}$ just present during the respective time interval $\Delta t_{ij}$.

4. Method according to claim 3, characterized in that the satellite is oriented towards the reference object with its positive x-axis ($S_{by}=S_{bz}=0$) during the first time interval $\Delta t_{12}$ and with the line bisecting the angle between its positive x-axis and its negative y-axis ($s_{bz}=0$, $S_{by}/S_{bx}=-1$) during the second time interval $\Delta t_{34}$.

* * * * *